Aug. 25, 1942.  A. ROBER  2,294,241
TREE ORNAMENT
Filed July 15, 1940  2 Sheets-Sheet 1
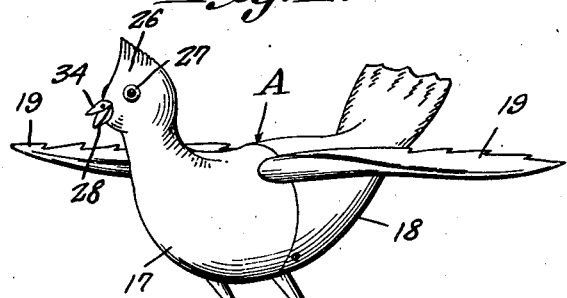
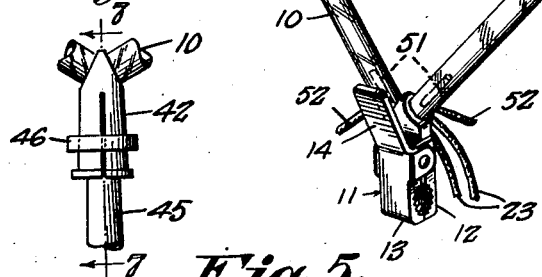
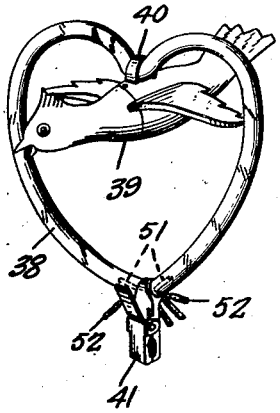
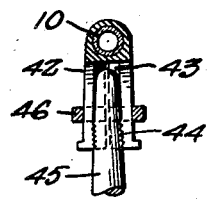
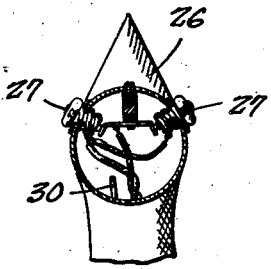
Anton Rober,
INVENTOR

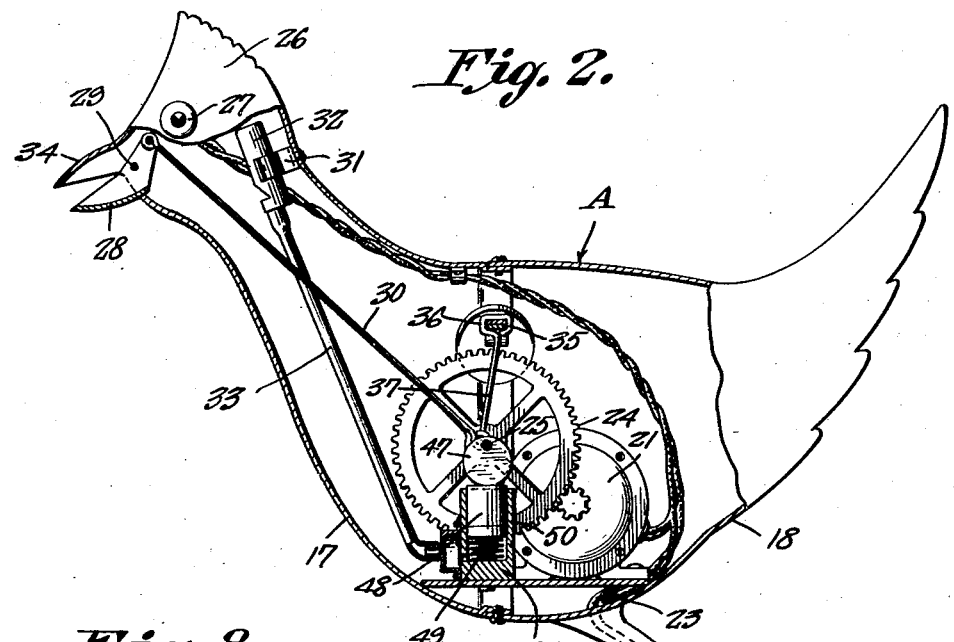

Patented Aug. 25, 1942

2,294,241

UNITED STATES PATENT OFFICE 2,294,241

TREE ORNAMENT

Anton Rober, Milwaukee, Wis.

Application July 15, 1940, Serial No. 345,643

2 Claims. (Cl. 46—118)

The invention relates to a tree ornament and more especially to an animated ornament for Christmas tree trimming or otherwise usable for ornamentation.

The primary object of the invention is the provision of an ornament of this character wherein its makeup is of image form, for example, being imitative of a bird or other living thing, and is susceptible of becoming animated to give an outward lifelike appearance thereto and also for creating a sound, for instance, a whistling sound.

Another object of the invention is the provision of an ornament of this character wherein the eyes of the image produced will be lighted so as to be lifelike in appearance while motion will be imparted to the wings to make it appear that the image is flying and in this way effecting animation for increasing the lifelike appearance to the said image.

A further object of the invention is the provision of an ornament of this character wherein the same can be fastened upon a tree so as to have it appear perched therein, particularly where the image is an imitation of a bird or the like, thereby adding to the attractiveness and giving a lifelike appearance thereto.

A still further object of the invention is the provision of an ornament of this character wherein the construction of the same is novel in its entirety and is ornamental and attractive in appearance.

A still further object of the invention is the provision of an ornament of this character, which is simple in its makeup, thoroughly reliable and efficient in operation, being automatic in the working thereof for effecting lifelike characteristics when arranged for a Christmas tree trimming and also it can be manufactured at a minimum cost.

With these and other objects in view, the invention consists in the features of construction, combination and arrangement of parts as will be hereinafter more fully described in detail, illustrated in the accompanying drawings, which disclose the preferred and modified forms of embodiment of the invention and pointed out in the claims hereunto appended.

In the accompanying drawings:

Figure 1 is a perspective view of the ornament constructed in accordance with the invention.

Figure 2 is a side elevation partly in section of the ornament.

Figure 3 is a fragmentary vertical transverse sectional view thereof.

Figure 4 is a further vertical transverse sectional view taken through the head of the image.

Figure 5 is a perspective view of a modification of the invention.

Figure 6 is a fragmentary elevation showing a modified form of fastener or clamp for the ornament.

Figure 7 is a sectional view taken on the line 7—7 of Figure 6 looking in the direction of the arrows.

Figure 8 is a sectional view taken approximately on line 8—8 of Figure 1 looking in the direction of the arrows.

Similar reference characters indicate corresponding parts throughout the several views in the drawings.

Referring to the drawings in detail, particularly Figure 1, the invention in this instance involves a substantially triangular-shaped, tubiformed perch or support 10, which has fitting with a clip 11 provided with stationary and movable jaws 12 and 13, respectively, the latter being controlled by a finger hold 14. This clip 11 enables the perch or support 10 to be fastened vertically upon a branch or limb of a tree for the arrangement of the ornament thereon, particularly with regard to a Christmas tree.

The perch or support 10 has perched thereon by feetlike clamps 15 two legs 16 of the image A. The image A is constructed with a two-part hollow body, the parts being designated 17 and 18, respectively. Located at opposite sides of the body involving the parts 17 and 18 are flexible wings 19, preferably made from rubber. Each wing 19 is coupled at 20 in an opening provided in the body having the parts 17 and 18, the opening 20 being formed in the part 17, and this wing is susceptible of swinging movement imitative of the flying activity of a living bird or the like.

Within the body involving the parts 17 and 18 is supported an electric motor 21 and an air pump 22, respectively. The motor 21 is arranged in an electric circuit, its wires 23 being trained through the legs 16 and the prop or support 10 for connection with an electric current supply in any approved manner. The motor 21 through driven connections 24 and 25, respectively, with the pump 22 operates the latter.

Arranged and fitted in the head 26 of the image created with the body A in the formation thereof are electric light bulbs 27 imitative of eyes and such bulbs 27 are electrically included in the circuit wiring 23 so that on illumination will effect lighted eyes to the said image. The image at the head 26 has built with the latter a movable bill 28, being pivoted at 29, and has linkage connection 30 related to and operated by the connections 24 and 25 so that when the motor 21 is running or operating motion will be imparted to the bill 28 for opening and closing movements thereof.

Arranged within the head 26 and held fast by a clip 31 interiorly of the latter is a sound-producing gadget or device, for example, a whistle 32. The gadget or device 32 has an air conduit 33 connected thereto and this conduit leads from the pump 22 so that when the latter is operating the gadget or device 32 will become active for producing a sound, which is audible exteriorly of the image on the opening of the bill 28 as the produced sound will issue through the mouth or form between the bills, the other bill 34 being stationary and is integral with the head 26.

The wings 19 have joined therewith overlapped actuator arms 35, these being threaded through an eye terminal 36 of a plunger or a reciprocating actuator rod 37, which has operative association with the connections 24 and 25 so that when the motor is active the wings 19 will be flexed in a manner to imitate the activity of a live bird when in flight or during flying.

In Figure 5 of the drawings there is shown a modification of the ornament wherein a tubular hanger frame 38 is created and of substantially heart shape for the loose suspension of the image 39 within this frame. The suspension is effected at 40 and such image is of the identical construction interiorly thereof to the image A for effecting animation or lifelike appearance thereto.

The frame is joined with the fastening clip 41 similar to the clip 11 hereinbefore described.

In Figures 6 and 7 of the drawings there is shown a modified form of fastener for the ornament and in this instance the said fastener is in the nature of a longitudinally split thimble 42, which is formed with an inwardly tapered socket 43 having therein biting teeth 44. This socket accommodates therein a staff or upright, a portion of the same being indicated at 45, and in this manner the ornament can be worn upon such staff or upright. There is arranged exteriorly on the thimble 42 a slidable tightening ring 46 for effecting contraction of said thimble at the socketed end portion thereof or allowing the spreading of said thimble so that it may be separably fastened to the staff or upright 45. The thimble 42 is joined with the frame or support 10 identically to the jointure of the clip 11 therewith and being a substitute for the latter or the clip 41.

The connection 24 is in the form of meshing rotary gears driven from the drive shaft 46 of the motor 21 while the connection 25 is in the form of a cranked shaft operated by the connection 24.

The connection 25, that is to say, the shaft forming a part thereof, has fixed thereto an eccentric 47, which is the actuator for the pump 22 operating directly on the plunger 48 of the same. The plunger 48 is maintained in contact with the eccentric by the use of a coiled spring 49 confined within the cylinder 50 of such pump.

The tubular support 10 and the hanger frame 38 may be made of any suitable material, reflective or otherwise, and of any color, but they are preferably glass and suitably illuminated, for example they may be of the filament lamp type, or the mercury or neon type, and I have shown electrodes 51 for the latter types and circuit wiring 52 leading from the electrodes.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. An ornament of the kind described, comprising an image having movable wings and a movable bill, a sound producing means within the image adjacent the movable bill, a motor within the image, a shaft driven by said motor, a crank carried by the shaft, a rod connecting the crank and the movable wings, a second crank carried by the shaft, a rod connecting said second crank and the movable bill, a pump cylinder below the shaft, an upwardly spring pressed plunger in the cylinder, an eccentric carried by the shaft and engaging the upper end of the plunger, and a flexible tube connection between the lower end of the cylinder and the sound producing means.

2. An ornament of the kind described, comprising an image having a hollow body portion, movable wings carried thereby, a movable bill carried by the head of the image, a sound producing means within the head of the image adjacent the movable bill, a motor within the hollow body, a horizontally disposed shaft driven by said motor, a crank carried by the shaft, a rod connecting the crank and the movable wings, a second crank carried by the shaft, a rod connecting said second crank and the movable bill, a vertically disposed pump cylinder below the shaft and spaced therefrom, an upwardly spring pressed plunger in the cylinder, an eccentric carried by the shaft and directly engaging the upper end of the plunger, and a flexible tube connected to the lower end of the cylinder and extending upwardly within the head and connected to the sound producing means.

ANTON ROBER.